United States Patent [19]

Susedik

[11] 3,955,075
[45] May 4, 1976

[54] DOORKNOB ILLUMINATING DEVICE

[76] Inventor: Joseph Susedik, 3107 W. Tyler, Anaheim, Calif. 92801

[22] Filed: Oct. 15, 1974

[21] Appl. No.: 514,468

[52] U.S. Cl............................ 240/2.13; 240/1 EL
[51] Int. Cl.²..................... F21V 33/00; E05B 17/10
[58] Field of Search.......................... 240/1 EL, 2.13

[56] References Cited
UNITED STATES PATENTS

| | | |
|---|---|---|
| 2,575,820 | 11/1951 | Linton .......................... 240/2.13 X |
| 3,018,362 | 1/1962 | Joyce ............................ 240/1 EL X |
| 3,214,214 | 10/1965 | Marchant....................... 240/2.13 X |
| 3,619,594 | 11/1971 | Morez............................... 240/2.13 |
| 3,819,928 | 6/1974 | Kuroyama et al. ............ 240/1 EL X |

*Primary Examiner*—Joseph F. Peters, Jr.

[57] ABSTRACT

A novel doorknob illuminating device is provided which comprises in combination a light source, a lucite rod for transmitting such light to the knob, and a lucite knob. A preferred embodiment utilizes a lucite rose ring for diffusing the light from the lucite rod to the lucite knob.

4 Claims, 4 Drawing Figures

DOORKNOB ILLUMINATING DEVICE

This invention relates to a unique device for providing an illuminated knob. One object of the invention is to provide an illuminated knob. Another object of the invention is to provide an illuminated knob wherein the light source need not be within the knob or adjacent to the knob but can be a distance from the knob. A still other object of the invention is to provide a unique means for transmitting light to an illuminated lucite doorknob. Other objects of the invention will appear from the following description.

This invention comprises, in combination, a light source transmitting light to and within a lucite rod which is in communication with a lucite knob by various means as described herein. Lucite has the unique property of being able to transmit light within the rod. This invention takes advantage and utilizes such unique property of lucite by making lucite the chief means of communicating the light from the light source to the lucite knob which emits the light to the surroundings thus providing an illuminated knob.

The providing of illuminated doorknobs is old in the art. U.S. Pat. Nos. 1,128,307 by GREELY; 693,214 by WILLIAMS and SPIKER; and 893,082 by LIND describe various arrangements wherein the light source is connected in or adjacent to a knob, particularly a hollow knob, for the providing of an illuminated doorknob. This invention greatly improves the art in that the light source need not be near to, in, or adjacent to the doorknob and thus less complicated electrical systems and more inexpensive light systems can be provided. In addition, the light from the device of this invention is much more decorative than those of the prior art and this invention can provide a more simpler, less expensive, less complicated means of providing an illuminated doorknob.

Figure 1:
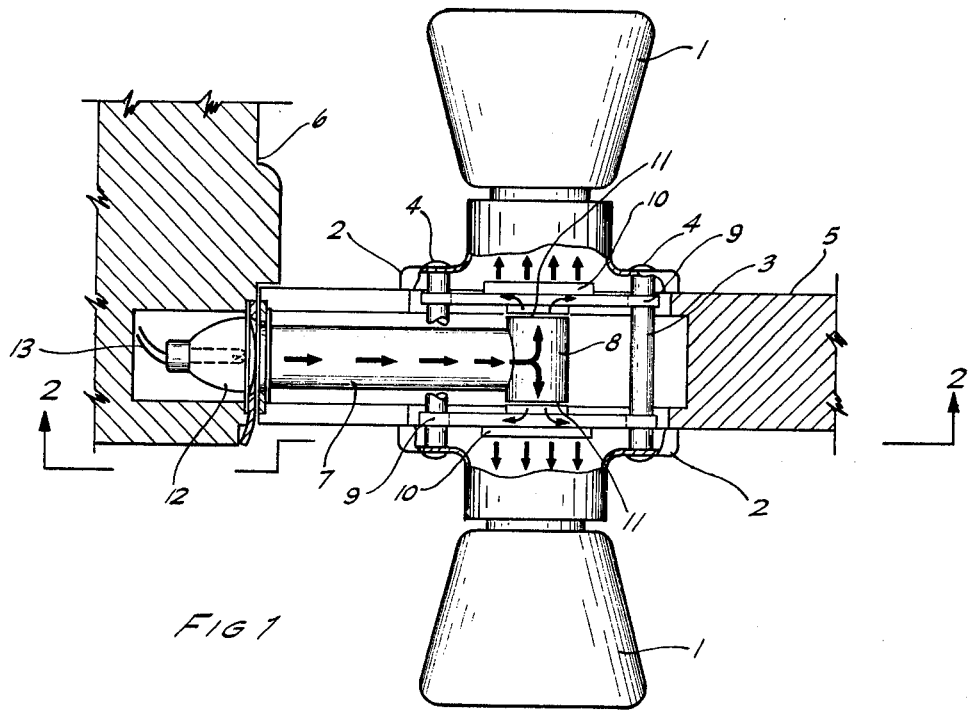
FIG. 1 is a plan view showing the lucite doorknob, lucite rod and light source enclosed within a door system.
Figure 2:
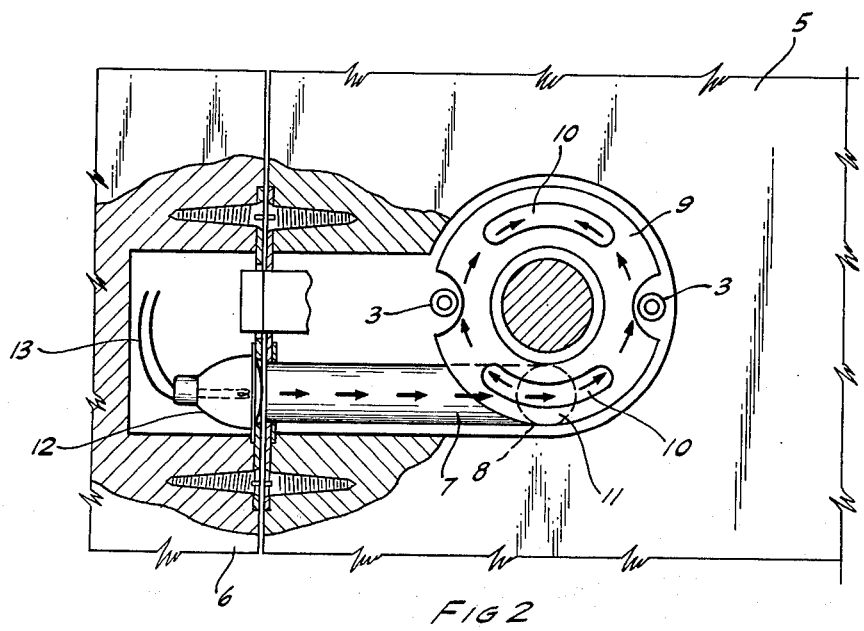
FIG. 2 is a sectional view along Line 2 of FIG. 1.
Figures 3, 4:
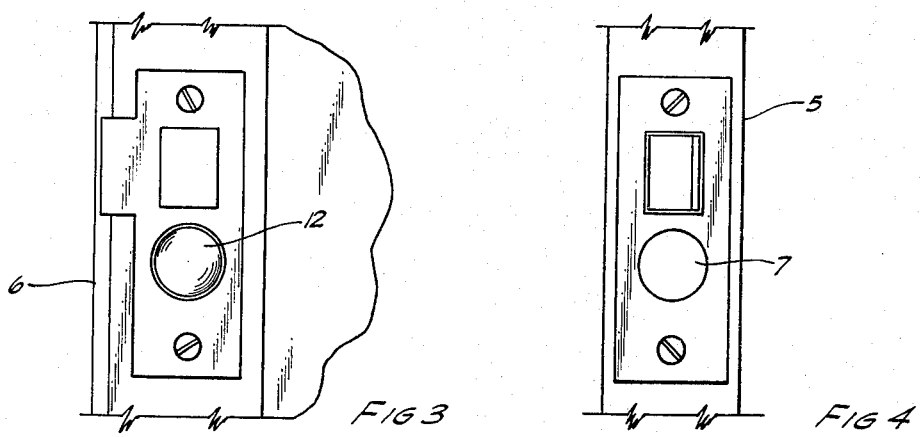
FIG. 3 and FIG. 4 are other cut-away views of the lucite rod system.

Referring to FIG. 1, the lucite doorknob 1 is connected by a rose ring 2 and by various connecting rods 3 and bolts 4 to door 5 by standard means which are well known in the art. FIG. 1 shows both the inside doorknob and the outside doorknob both of which or either of which may be illuminated with, of course, the outer doorknob being illuminated. Within the door system 6 is a light source 12 connected to an electrical source by lines 13. The electrical means can be either AC or DC current with the required voltage being minimal and standard in the arts sufficient to provide electrical energy to the light source which may be any standard bulb. The light source 12 is standard in the art and can be of any magnitude sufficient to provide light to the lucite knob. A battery providing 12 volts is sufficient. A lucite rod, preferably a solid lucite rod, is connected within the door system such that the light source emits light into the end of the rod as shown in FIG. 1. The end of the lucite rod is shown connected to a lucite "tee" 8 such that the light travels down the rod and through the tee as shown by the arrows in FIG. 1 and through the end of the tee 11 and into the lucite rose ring 9. The light circles the rose ring and is diffused through lucite protrusion 10 into he lucite doorknob. The lucite doorknob 1 is preferably solid. The lucite rose ring and lucite protrusion for each of the doorknobs is not necessary to the operation of the invention herein but is a preferred embodiment in that it more uniformily diffuses the light within the lucite doorknob.

I claim:

1. A device for the providing of a decorative illuminated doorknob comprising, in combination, a door, a light source outside such door, a plastic light transmitting rod within such door for transmitting light from such light source, a plastic light transmitting doorknob, in communication with such rod and light source and means for transmitting such light from such light source to such doorknob whereby the light received by such rod is transmitted to such doorknob from inside such door.

2. The invention of claim 1 wherein such means comprises a lucite tee.

3. The invention of claim 1 wherein such means comprises a lucite tee and a light rose ring.

4. The invention of claim 1 wherein the plastic light transmitting doorknob is lucite.

* * * * *